United States Patent
Yasugi

(10) Patent No.: US 8,541,899 B2
(45) Date of Patent: Sep. 24, 2013

(54) WIND TURBINE GENERATOR SYSTEM, CONTROL APPARATUS THEREFOR, AND CONTROL METHOD THEREFOR

(75) Inventor: Akira Yasugi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/813,074

(22) PCT Filed: Feb. 24, 2012

(86) PCT No.: PCT/JP2012/054644
§ 371 (c)(1),
(2), (4) Date: Jan. 29, 2013

(65) Prior Publication Data
US 2013/0221671 A1 Aug. 29, 2013

(51) Int. Cl.
*F03D 9/00* (2006.01)
*H02P 9/04* (2006.01)

(52) U.S. Cl.
USPC .................................................. 290/44

(58) Field of Classification Search
USPC .................................... 290/44, 55
See application file for complete search history.

(56) References Cited

U.S. PATENT DOCUMENTS

| | | | |
|---|---|---|---|
| 7,281,891 B2 * | 10/2007 | Smith et al. | 415/4.3 |
| 2009/0146423 A1 | 6/2009 | Arinaga | |
| 2010/0286835 A1 | 11/2010 | Nyborg et al. | |
| 2011/0144816 A1 | 6/2011 | Morjaria et al. | |

FOREIGN PATENT DOCUMENTS

| | | |
|---|---|---|
| JP | 2003-343416 A | 12/2003 |
| JP | 2006-226189 A | 8/2008 |
| JP | 4848477 B1 | 12/2011 |

OTHER PUBLICATIONS

Written Opinion corresponding to PCT/JP2012/054644, mailed May 29, 2012.

* cited by examiner

*Primary Examiner* — Javaid Nasri
(74) *Attorney, Agent, or Firm* — Kanesaka Berner & Partners, LLP

(57) ABSTRACT

In a control apparatus for a wind turbine generator system, a wind turbine classifying unit classifies a plurality of wind turbines into a first wind turbine group that does not satisfy a rated wind speed condition and a second wind turbine group that satisfies the rated wind speed condition. A first controlling unit releases, for the wind turbines of the first wind turbine group, the output power reducing operation and causes the wind turbines of the first wind turbine group to perform an output power corresponding to a wind condition. A second controlling unit supplements a first deviation, which is a difference between a total output power of the first wind turbine group and a target output power, with an output power from the wind turbine of the second wind turbine group.

7 Claims, 6 Drawing Sheets

WIND TURBINE GENERATOR SYSTEM, CONTROL APPARATUS THEREFOR, AND CONTROL METHOD THEREFOR

RELATED APPLICATIONS

The present application is National Phase of International Application Number PCT/JP2012/054644, filed Feb. 24, 2012.

TECHNICAL FIELD

The present invention relates to a wind turbine generator system, a control apparatus therefor, and a control method therefor.

BACKGROUND ART

In recent years, in a wind farm where a plurality of wind turbines are set, output power reducing operation (Delta Power Control) for performing operation for deliberately reducing output powers of the wind turbines and securing a reserve capacity for an output power is performed. For example, United States Patent Publication No. 2010/0286835 discloses that a wind speed-output power characteristic corresponding to the output power reducing operation is set in advance, a target output power corresponding to wind speed at each time is acquired using a wind speed-power curve of the wind speed-output power characteristic, and control of wind turbines is performed to attain the target output power.

United States Patent Publication No. 2011/0144816 discloses that, when an output power at a connection point is equal to or smaller than a target output power, an output power of at least one wind turbine is increased to match the output power at the connection point to the target output power.

CITATION LIST

Patent Literature

{PTL 1}
United States Patent Publication No. 2010/0286835
{PTL 2}
United States Patent Publication No. 2011/0144816

SUMMARY OF INVENTION

Technical Problem

Conventionally, during the output power reducing operation, an output power increase request for increasing an output power is sometimes issued from a utility grid side. In such a case, it is desirable to increase the output to a requested output power requested from the utility grid side. However, depending on a wind condition at the point, a desired output power cannot be obtained.

It is an object of the present invention to provide a wind turbine generator system that suppresses an output power decrease amount due to a wind speed drop when an output power increase request is issued during output power reducing operation, a control apparatus for the wind turbine generator system, and a control method therefor.

Solution to Problem

A first aspect of the present invention is a control apparatus applied to a wind turbine generator system in which output powers of a plurality of wind turbines are supplied to a utility grid through a common connection point, the control apparatus for the wind turbine generator system including: a wind turbine classifying unit for classifying, when an output power increase request is notified from the utility grid side during output power reducing operation, the plurality of the wind turbines into a first wind turbine group that does not satisfy a rated wind speed condition and a second wind turbine group that satisfies the rated wind speed condition; a target setting unit for setting a target output power after reception of the output power increase request; a first controlling unit for releasing, for the wind turbines of the first wind turbine group, the output power reducing operation and causing the wind turbines of the first wind turbine group to perform an output power corresponding to a wind condition; and a second controlling unit for supplementing a first deviation, which is a difference between a total output power of the first wind turbine group and the target output power, with an output power from the wind turbine of the second wind turbine group.

A second aspect of the present invention is a control method applied to a wind turbine generator system in which output powers of a plurality of wind turbines are supplied to a utility grid through a common connection point, the control method for the wind turbine generator system including: a wind turbine classifying step of classifying, when an output power increase request is notified from the utility grid side during output power reducing operation, the plurality of the wind turbines into a first wind turbine group that does not satisfy a rated wind speed condition and a second wind turbine group that satisfies the rated wind speed condition; a target setting step of setting a target output power after reception of the output power increasing request; a first controlling step of releasing, for the wind turbines of the first wind turbine group, the output power reducing operation and causing the wind turbines of the first wind turbine group to perform an output power corresponding to a wind condition; and a second controlling step of supplementing a first deviation, which is a difference between a total output power of the first wind turbine group and the target output power, with an output power from the wind turbine of the second wind turbine group.

A third aspect of the present invention is a wind turbine generator system including a plurality of wind turbines and the control apparatus for the wind turbine generator system.

Advantageous Effects of Invention

According to the present invention, there is an effect that, when an output power increase request is issued during output power reducing operation, it is possible to suppress an output power decrease amount due to a wind speed drop.

DESCRIPTION OF EMBODIMENTS

A wind turbine generator system according to an embodiment of the present invention, a control apparatus therefor, and a control method therefor are explained below with reference to the drawings.

Figure 1:
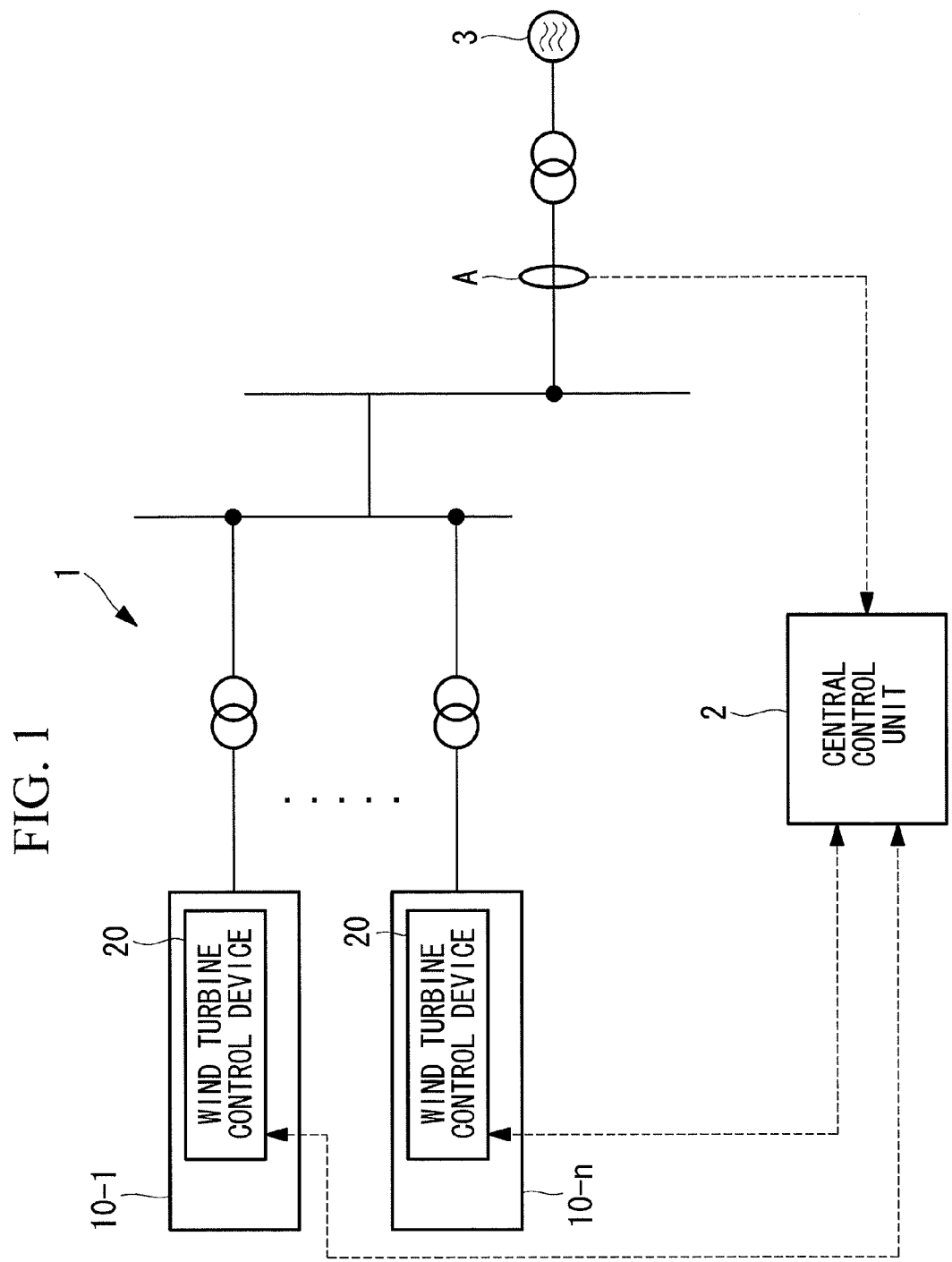
FIG. 1 is a diagram showing an overall configuration of a wind turbine generator system according to an embodiment of the present invention.

FIG. 1 is a diagram showing an overall configuration of the wind turbine generator system according to this embodiment. As shown in FIG. 1, a wind turbine generator system 1 includes a plurality of wind turbines 10-1, . . . , and 10-n (hereinafter, when all the wind turbines are indicated, reference numeral "10" is simply affixed and, when the respective wind turbines are indicated, reference numerals "10-1", "10-n", and the like are affixed.) and a central control unit 2 that gives output power commands to the wind turbines 10.

Figure 2:
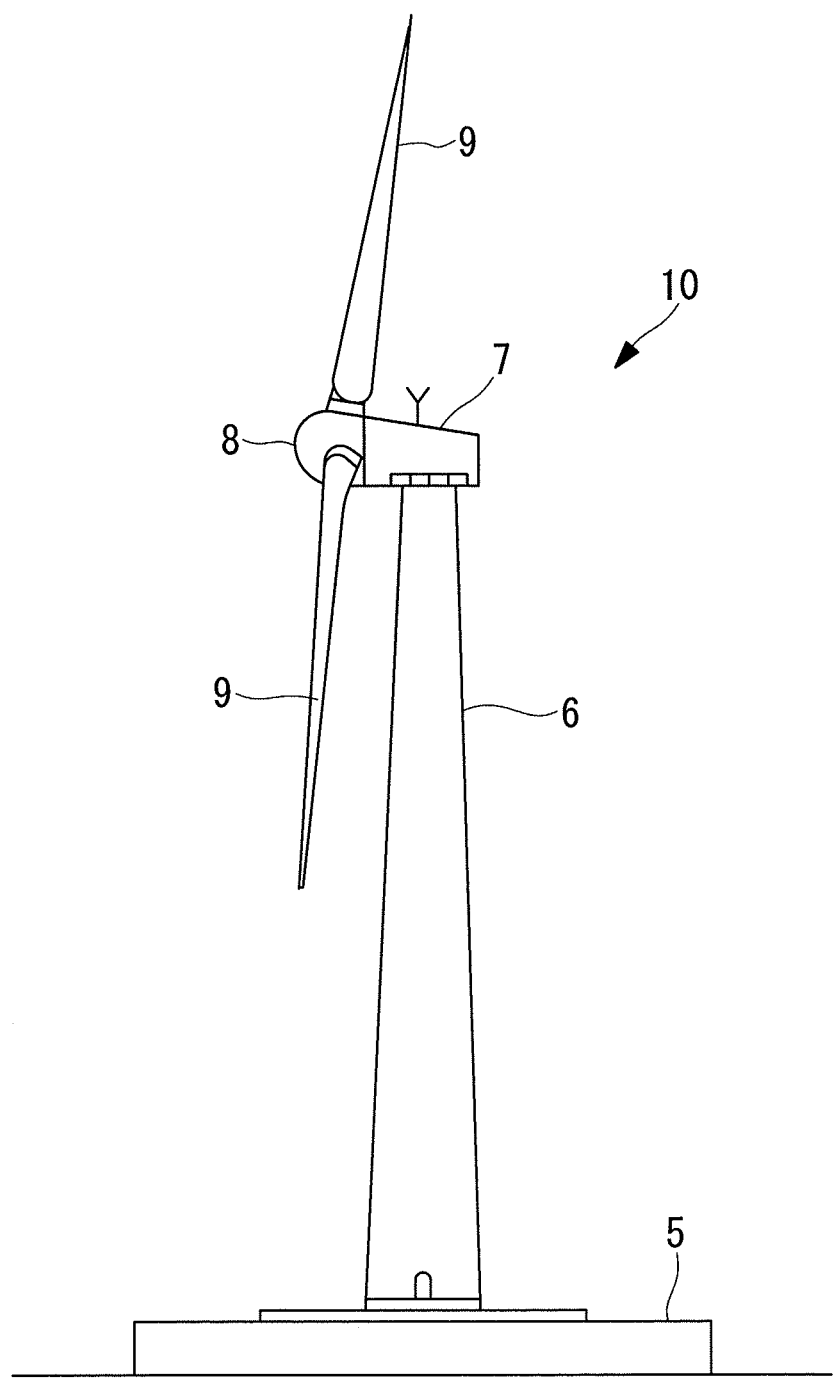
FIG. 2 is an external view of a wind turbine shown in FIG. 1.

In this embodiment, all the wind turbines 10 are variable speed wind turbines, rotating speed of which can be controlled according to wind speed. FIG. 2 is an external view of the wind turbine 10 and FIG. 3 is a schematic diagram showing an electrical configuration of the wind turbine 10.

As shown in FIG. 2, the wind turbine 10 includes a tower 6 vertically provided on a foundation 5, a nacelle 7 set at the upper end of the tower 6, and a rotor head 8 provided in the nacelle 7 to be capable of rotating about a substantially parallel axis.

A plurality of blades 9 are radially attached to the rotor head 8 about the rotation axis thereof. The blades 9 are coupled to the rotor head 8 to be capable of rotating according to an operation condition. A pitch angle of the blades 9 can be changed.

Figure 3:
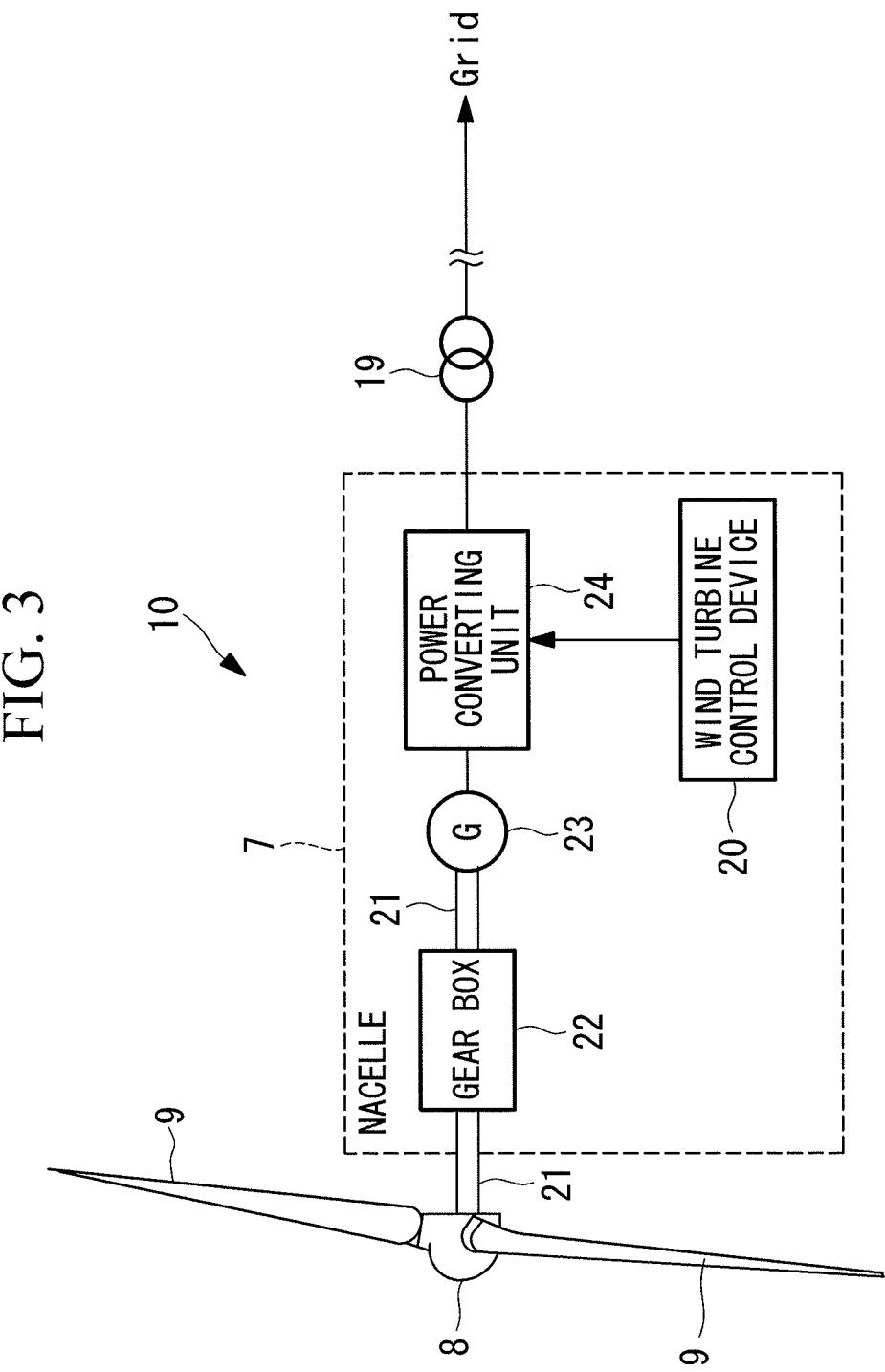
FIG. 3 is a schematic diagram schematically showing an electrical configuration of the wind turbine shown in FIG. 1.

As shown in FIG. 3, a gear box 22 and a generator 23 are mechanically coupled to a rotating shaft 21 of the rotor head 8. The generator 23 may be a synchronous generator or may be an induction generator. The gear box 22 does not have to be provided.

The rotor head 8 is rotated about the rotation axis by a force of wind that hits the blades 9 from the rotation axis direction of the rotor head 8. The rotation force is accelerated by the gear box 22, transmitted to the generator 23, and converted into electric power. The generated electric power of the generator 23 is converted into electric power corresponding to a utility grid 3 by a power converting unit 24 and supplied to a utility grid 1 via a transformer 19.

Control of the power converting unit 24, pitch angle control for the blades 9, and the like are performed by wind turbine control devices 20 respectively provided to correspond to the wind turbines.

Figure 4:
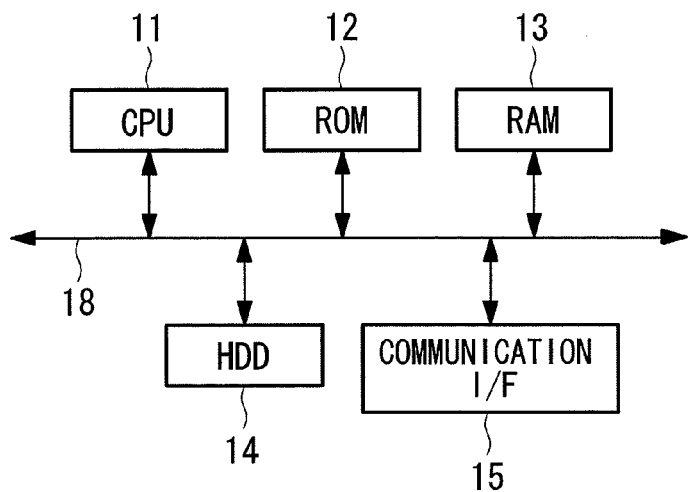
FIG. 4 is a diagram showing an example of a hardware configuration of a central control unit shown in FIG. 1.

The central control unit 2 includes a computer and includes, as main components, for example, as shown in FIG. 4, a CPU 11, a ROM (Read Only Memory) 12 for storing programs and the like to be executed by the CPU 11, a RAM (Random Access Memory) 13 functioning as a work area during execution of the programs, a hard disk drive (HDD) 14 functioning as a large capacity storage device, and a communication interface 15 for connecting the central control unit 2 to a network. These units are connected via a bus 18. The central control unit 2 may include an access unit to which an external storage device is attached, an input unit including a keyboard and a mouse, and a display unit including a liquid crystal display device that displays data.

A storage medium for storing the programs and the like to be executed by the CPU 11 is not limited to the ROM 12. The storage medium may be other auxiliary storage devices such as a magnetic disk, a magneto optical disk, and a semiconductor memory.

Figure 5:
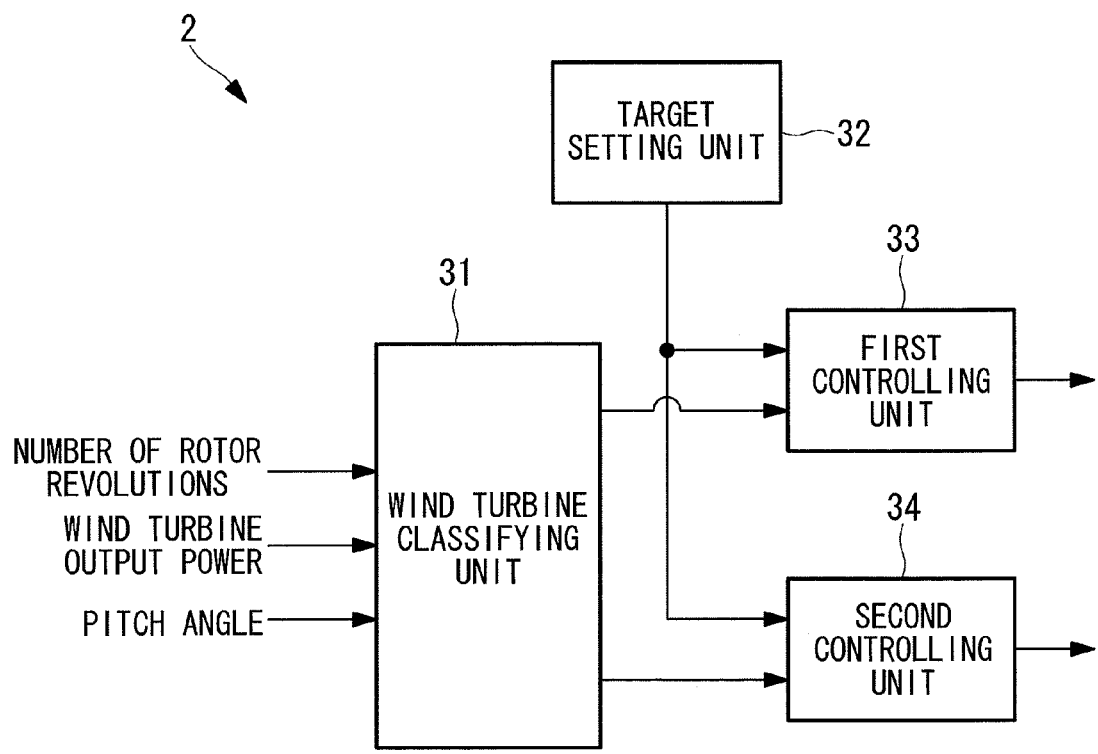
FIG. 5 is a diagram showing a functional block diagram of an output power increase control function actuated when an output power increase request is notified during output power reducing operation among various functions included in the central control unit shown in FIG. 1.

FIG. 5 is a diagram showing a functional block diagram of an output power increase control function actuated when an output power increase request is notified during output power reducing operation among various functions included in the central control unit 2. Processing realized by units shown in FIG. 5 is realized by the CPU 11 reading out the programs stored in the ROM 12 to the RAM 13 and executing the programs.

As shown in FIG. 5, the central control unit 2 includes a wind turbine classifying unit 31, a target setting unit 32, a first controlling unit 33, and a second controlling unit 34.

When an output power increase request is notified from a utility grid side during output power reducing operation, the wind turbine classifying unit 31 classifies the plurality of wind turbines 10-1, . . . , and 10-n into a first wind turbine group that does not satisfy a rated wind speed condition and a second wind turbine group that satisfies the rated wind speed condition.

For example, numbers of rotor revolutions, wind turbine output powers, and pitch angles of the wind turbines are notified to the central control unit 2 from the wind turbine control devices 20 of the wind turbines 10 at any time.

The wind turbine classifying unit 31 determines, using these kinds of information from the wind turbines, whether or not the wind turbines satisfy the rated wind speed condition and classifies the wind turbines into the first wind turbine group and the second wind turbine group. Whether or not the wind turbines satisfy the rated wind speed condition is determined according to, for example, whether or not wind speed satisfies a range of wind speed equal to or higher than 11.5 m/sec and equal to or lower than 25 m/sec. For example, the wind turbine classifying unit 31 obtains input torque from the numbers of rotor revolutions and the wind turbine output powers and estimates input wind speed from the input torque. The wind turbine classifying unit 31 determines whether or not the estimated input wind speed satisfies the rated wind speed condition. In the determination, the pitch angles are used to check presence or absence of abnormality of an input signal, for example, whether or not a relation between the numbers of rotor revolutions and the output powers is appropriate.

In the wind turbine of the first wind turbine group that does not satisfy the rated wind speed condition, even if an increase in a wind turbine output power is desired, it is difficult to obtain a desired output power because wind speed is insufficient. On the other hand, in the wind turbine of the second wind turbine group that satisfies the rated wind speed condition, in general, since pitch angle control for fixing output powers is performed, it is possible to further increase the wind turbine output power according to the pitch angle control.

From the above, since the determination concerning whether or not the rated wind speed condition is satisfied is performed, it is possible to distinguish the wind turbine that can increase an output power and the wind turbine that cannot increase an output power.

When the output power increase request is notified from the utility grid side during the output power reducing operation, upon receiving the output power increase request, the target setting unit 32 sets, as a target output power, a value obtained by adding a reduction amount of a deliberately reduced output power to an output power at a connection point A. The setting value is used as the target output power after the output power increase request.

Instead of the aspect explained above, for example, a necessary additional output power request value may be calculated from a fluctuation amount of a utility grid frequency and set as a target value. In this case, the target setting unit 32 has, in advance, conversion information in which frequency fluctuation amounts and additional output power request values are associated, acquires an additional output power request value corresponding to a frequency fluctuation amount at each time using the conversion information, and sets the additional output power request value as a target output power.

The first controlling unit 33 releases, for the wind turbines of the first wind turbine group, the output power reducing operation and causes the wind turbines of the first wind turbine group to perform normal operation corresponding to a wind condition. For example, the first controlling unit 33 sets, for the wind turbines of the first wind turbine group, output power commands corresponding to a wind condition at each time and output powers the set output power commands to the wind turbines.

The second controlling unit 34 calculates a first deviation between a total of output powers of the first wind turbine group and the target output power set by the target setting unit 32 and sets output power commands for the wind turbines of the second wind turbine group for supplementing the first deviation. The second controlling unit 34 stores an upper limit value of output power commands for the wind turbines in advance and sets output power commands for the wind turbines in a range of values equal to or smaller than the upper limit value.

Figure 6:
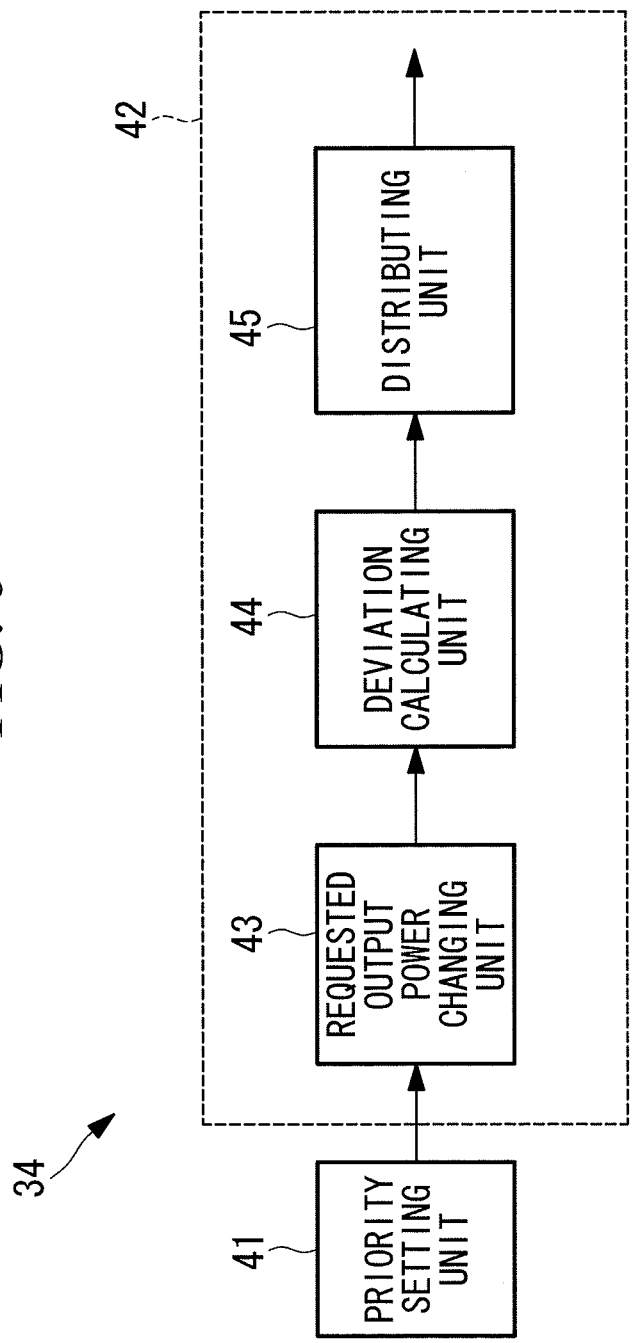
FIG. 6 is a diagram showing a configuration example of a second controlling unit shown in FIG. 5.

The second controlling unit 34 includes, for example, as shown in FIG. 6, a priority setting unit 41 and an output power command setting unit 42.

The priority setting unit 41 sets priority for the wind turbines of the second wind turbine group on the basis of a wind condition. More specifically, the priority setting unit 41 sets higher priority for the wind turbine in which wind speed is higher and a larger output power increase can be expected.

The output power command setting unit 42 sets output power commands for the wind turbines of the second wind turbine group such that an output power of the wind turbine having high priority is higher than an output power of the wind turbine having low priority. The output power command setting unit 42 includes, for example, a requested output power changing unit 43, a deviation calculating unit 44, and a distributing unit 45.

The requested output power changing unit 43 changes a requested output power set before the reception of the output power increase request (e.g., a requested output power notified from the utility grid side during the output power reducing operation) to be increased. For example, when the requested output power set before the reception of the output power increase request is 60% of a rated output power, the requested output power changing unit 43 changes the requested output power to 80% of the rated output power. At this point, a requested output power after the change is set to be equal to or smaller than the rated output power.

The deviation calculating unit 44 calculates a second deviation, which is a difference between a total output power of the first wind turbine group obtained by multiplying the requested output power after the change with the number of wind turbines of the first wind turbine group and the first deviation. That is, the deviation calculating unit 44 calculates the second deviation using Equation (1) below.

$$\Delta P2 = \Delta P1 - (Pdem \times m) \quad (1)$$

In Equation (1), $\Delta P2$ is the second deviation, $\Delta P1$ is the first deviation, i.e., the deviation between the target output power and the total output power of the first wind turbine group, Pdem is the requested output power after the change, and m is the number of wind turbines of the second wind turbine group.

The distributing unit 45 allocates, by each predetermined amount, the second deviation $\Delta P2$ to the wind turbines in order from the wind turbine having the highest priority. A method of the distribution is not specifically limited. For example, a method of setting, in advance, a largest distribution amount that can be allocated to the wind turbines and allocating the largest distribution amount to the wind turbines in order from the wind turbine having the highest priority is conceivable.

By distributing the second deviation $\Delta P2$ in order from the wind turbine having the highest priority degree in this way, it is possible to set the output power command for the wind turbine having high priority degree to a value larger than the output power command for the wind turbine having low priority.

In this way, the output power commands generated by the first controlling unit 33 are transmitted to the wind turbines of the first wind turbine group and the output power commands generated by the second controlling unit 34 are transmitted to the wind turbines of the second wind turbine group. The transmitted output power commands are received by the wind turbine control devices 20 of the wind turbines. Pitch angle control for the blades 9 and control of the power converting unit 24 are performed on the basis of the received output power commands. Consequently, output powers of the wind turbines conform to the output power commands. An output power at the connection point A is controlled to be closer to the target output power.

The classification of the wind turbines by the wind turbine classifying unit 31, the generation of output power commands by the first controlling unit 33, and the generation of output power commands by the second controlling unit 34 are repeatedly performed at a predetermined time interval, whereby, even if a wind condition changes, it is possible to realize classification of the wind turbines corresponding to the wind condition. It is possible to supplement, as much as possible, a decrease in an output power of the wind turbine in which wind speed drops (i.e., the wind turbine belonging to the first wind turbine group) by increasing an output power of the wind turbine that satisfies the rated wind speed condition (i.e., the wind turbine belonging to the second wind turbine group). Consequently, it is possible to suppress output power fluctuation at the connection point A due to a wind speed drop.

Figure 7:
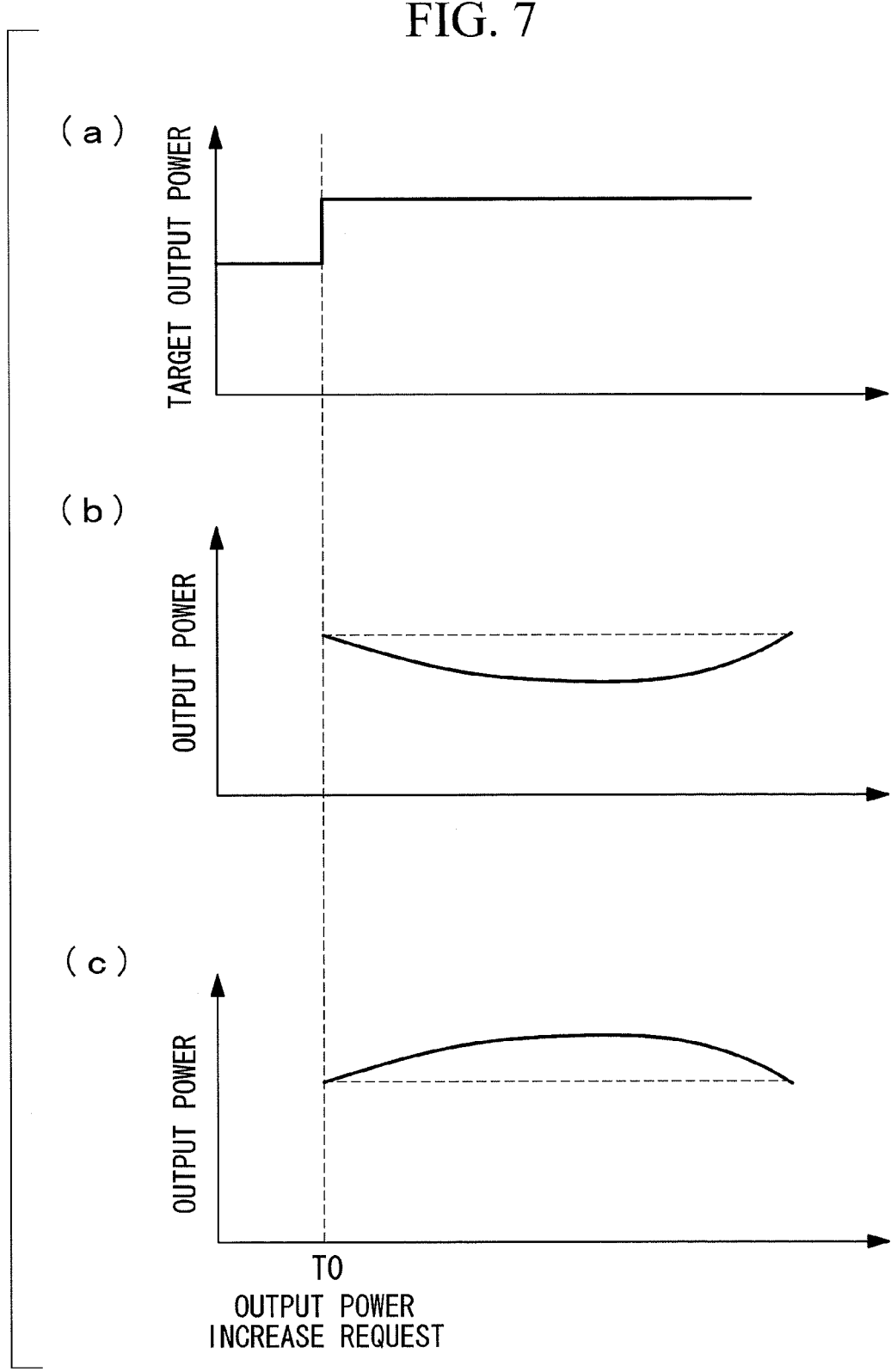
FIG. 7 is a diagram for explaining an output power decrease of a wind turbine of a first wind turbine group and an output power increase of a wind turbine of a second wind turbine group.

In FIG. 7, examples of a target output power after an output power increase request is notified (see FIG. 7(a)), a total output power of the first wind turbine group (see FIG. 7(b)), and a total output power of the second wind turbine group (see FIG. 7(c)) are shown. As shown in FIG. 7, when the total output power of the first wind turbine group decreases according to a wind condition, the decrease is supplemented by an increase in the total output power of the second wind turbine group as much as possible. Therefore, it is possible to match an output power at the connection point A to the target output power.

Note that, when a decrease amount in the total output power of the first turbine group is large, it is also probable that the output power decrease cannot be fully supplemented even if the total output power of the second wind turbine group is increased. Even in this case, it is possible to suppress a decrease in an output power due to a wind speed drop as much as possible by increasing the total output power of the second wind turbine group as much as possible.

In this embodiment, the second controlling unit 34 sets the priority for the wind turbines of the second wind turbine group according to wind speed and sets the output power command for the wind turbine having the high priority higher than the output power command for the wind turbine having the low priority. However, the present invention is not limited to this aspect. For example, the first deviation ΔP1, which is the difference between the target output power and the total output power of the first wind turbine group, may be equally allocated to the wind turbines of the second wind turbine group. In this case, a value obtained by dividing the first deviation ΔP1 by the number of wind turbines m of the second wind turbine group is set as output power commands for the wind turbines. Weighting coefficients may be determined for the wind turbines and the first deviation ΔP1 may be distributed to the wind turbines of the second wind turbine group on the basis of the weighting coefficients.

REFERENCE SIGNS LIST 1 wind turbine generator system
10-1, 10-n wind turbines
2 central control unit
3 utility grid
20 wind turbine control devices
31 wind turbine classifying unit
32 target setting unit
33 first controlling unit
34 second controlling unit
41 priority setting unit
42 output power command setting unit
43 requested output power changing unit
44 deviation calculating unit
45 distributing unit
A connection point

The invention claimed is:

1. A control apparatus applied to a wind turbine generator system in which output powers of a plurality of wind turbines are supplied to a utility grid through a common connection point, the control apparatus for the wind turbine generator system comprising:
a wind turbine classifying unit for classifying, when an output power increase request is notified from the utility grid side during output power reducing operation, the plurality of the wind turbines into a first wind turbine group that does not satisfy a rated wind speed condition and a second wind turbine group that satisfies the rated wind speed condition;
a target setting unit for setting a target output power after reception of the output power increase request;
a first controlling unit for releasing, for the wind turbines of the first wind turbine group, the output power reducing operation and causing the wind turbines of the first wind turbine group to perform an output power corresponding to a wind condition; and
a second controlling unit for supplementing a first deviation, which is a difference between a total output power of the first wind turbine group and the target output power, with an output power from the wind turbine of the second wind turbine group.

2. The control apparatus for the wind turbine generator system according to claim 1, wherein the second control unit includes:
a priority setting unit for setting priority for the wind turbines of the second wind turbine group on the basis of a wind condition; and
a output power command setting unit for setting output power commands for the wind turbines of the second wind turbine group such that an output power of the wind turbine having a high priority is higher than an output power of the wind turbine having a low priority.

3. The control apparatus for the wind turbine generator system according to claim 2, wherein the output power command setting unit includes:
a requested output power changing unit for changing a requested output power set before the reception of the output power increase request to be increased;
a deviation calculating unit for calculating a second deviation, which is a difference between a total output power of the first wind turbine group obtained by multiplying the requested output power after the change with a number of the wind turbines of the first wind turbine group and the first deviation; and
a distributing unit for allocating the second deviation to the wind turbines in order from the wind turbine having the highest priority.

4. The control apparatus for the wind turbine generator system according to claim 1, wherein the second control unit distributes the first deviation to the wind turbines of the second wind turbine group equally or on the basis of a weighting coefficient set for each of the wind turbines in advance and generates output power commands for the wind turbines.

5. The control apparatus for the wind turbine generator system according to claim 1, wherein the wind turbine classifying unit receives numbers of rotor revolutions, wind turbine output powers, and pitch angles from the wind turbines and determines, using the received numbers of rotor revolutions, wind turbine output powers, and pitch angles, for each of the wind turbines, whether or not the wind turbine satisfies the rated wind speed condition.

6. A wind turbine generator system comprising:
a plurality of wind turbines; and
the control apparatus for the wind turbine generator system according to claim 1.

7. A control method applied to a wind turbine generator system in which output powers of a plurality of wind turbines are supplied to a utility grid through a common connection point, the control method for the wind turbine generator system comprising:
a wind turbine classifying step of classifying, when an output power increase request is notified during output power reducing operation, the plurality of the wind turbines into a first wind turbine group that does not satisfy a rated wind speed condition and a second wind turbine group that satisfies the rated wind speed condition;
a target setting step of setting a target output power after reception of the output power increasing request;
a first controlling step of releasing, for the wind turbines of the first wind turbine group, the output power reducing operation and causing the wind turbines of the first wind turbine group to perform an output power corresponding to a wind condition; and
a second controlling step of supplementing a first deviation, which is a difference between a total output power of the first wind turbine group and the target output power, with an output power from the wind turbine of the second wind turbine group.

* * * * *